United States Patent
Abel

[11] 3,797,089
[45] Mar. 19, 1974

[54] MACHINE FOR MAKING AND INJECTING LUBRICANT-IMPREGNATED WICKING MATERIAL

[76] Inventor: Martin L. Abel, 25235 Canterbury, Franklin, Mich. 48025

[22] Filed: Oct. 17, 1972

[21] Appl. No.: 298,425

[52] U.S. Cl... 29/200 B, 29/148.4 L, 29/149.5 NM, 29/201, 29/419
[51] Int. Cl.................. B23p 19/00, B23p 17/00
[58] Field of Search. 29/200 B, 149.5 NM, 148.4 L, 29/201, 419

[56] References Cited
UNITED STATES PATENTS
3,226,801  1/1966  Abel.................. 29/149.5 NM
3,399,648  9/1968  Abel.................. 241/38 X

*Primary Examiner*—Thomas H. Eager

[57] ABSTRACT

A machine for making lubricant-impregnated wicking material and injecting it into the well of a bearing element. The machine includes a chamber and means for making a charge of the lubricant-impregnated wicking material and depositing it into the chamber. A piston is movable in the chamber between first and second positions, the charge of wicking material being deposited in the path of the piston when it is in the first position. Flow path means is provided between the chamber and the bearing element so that when the piston moves toward the second position the wicking material will flow along the path and into the well of the bearing element.

23 Claims, 4 Drawing Figures

MACHINE FOR MAKING AND INJECTING LUBRICANT-IMPREGNATED WICKING MATERIAL

BACKGROUND OF THE INVENTION

This invention relates to machines that are capable of making oil impregnated wicking material and injecting it into the well of a bearing element, and more particularly to on-site machines that are capable of manufacturing metered amounts of the oil impregnated wicking material for immediate injection.

This invention is an improvement over the machines shown and described in my U.S. Pat. Nos. 3,226,801 and 3,399,648.

It has been found that when a fibrous wicking material impregnated with oil is injected and sealed in elements having bearing surfaces, significant advantages result. The ability of the fibers to retain and support the oil is such that the bearing surfaces are uniformly self-lubricating for the life of the bearing without the need for additional lubricant.

Many types of pre-packaged bearings are now being produced. These bearings are assembled in individual packages, filled with the proper amount of oil impregnated wicking material and sealed. The bearing packages can then be conveniently stored, shipped or mounted on a machine.

Machines have been developed to inject the oil impregnated wicking material into these pre-packaged bearings. Some of the machines simply have a hopper into which a large batch of prepared oil impregnated wicking material is kept. The material is then removed from the hopper and injected under pressure into the bearing element. However, because of the relatively high pressure required to be exerted on the material and the long distance it had to travel between the hopper and bearing element, only wicking material made of wood fibers or mixtures containing a large proportion of wood fibers could be used without the oil and fibers separating.

The machines in the patents mentioned above were developed to overcome this problem. These machines, instead of transferring the oil impregnated wicking material from a hopper to the bearing element, actually manufacture the oil impregnated wicking material in metered amounts and then inject it into the bearing element. Because the new machines require a much lower injection pressure and significantly shorter travel distance for the oil impregnated wicking material, many other types of fibrous materials, such as for example cotton and wool, can be used. These other materials are more advantageous than wood because they are capable of retaining and supporting greater amounts of lubricating oil.

These improved machines include a shredder for removing fibers from a web of the fibrous material, while at the same time oil is applied in predetermined amounts to the loose fibers to form a charge. The charge is then pushed by a piston horizontally into the path of a second piston which then pushes the wicking material upward and through a nozzle for injection into the well of the bearing element. All of the components of the machines used to inject the wicking material are mounted beneath the bearing element in a large base frame. A C-shaped head is mounted on the frame, the top portion of which is movable up and down for clamping the bearing element in place over the injection nozzle.

However, even though these machines offered significant advantages over prior art machines, the machines proved to have several disadvantages. First, with most of the movable component parts located beneath the working surface, access to them was difficult for maintenance and repair. In addition, since some of the parts were integral with the base frame the entire machine had to be removed for replacement of the portion that manufactures and injects the oil impregnated wicking material.

The machines also have two separate moving operations for transferring the manufactured material under pressure to the bearing element, which requires a relatively large number of moving parts. This makes the machines more expensive to produce and creates a greater likelihood of breakdown when compared to machines with a smaller number of moving parts. There is also a greater chance of the oil separating from the fibrous material when pressure is exerted on the material in two separate steps and from different directions.

SUMMARY OF THE INVENTION

There is provided, in accordance with the invention, a machine for manufacturing oil impregnated wicking material for overhead injection that solves the problems discussed above.

The machine is a unit mounted on top of a base frame and has all of its movable parts located above the bearing element. The machine includes a shredder which separates fibers from a web of wicking material wound on a spool that is mounted on the machine. The web of fibrous material is fed at a predetermined rate between a pair of rollers onto the shredder. After the fibers are separated from the end of the web, a measured amount of lubricant such as oil is sprayed against the shredder teeth to impregnate the loose fibrous mass and form a metered charge of the oil impregnated wicking material. The charge then falls by gravity into a chamber or well which is in the path of a piston.

After a sufficient amount of wicking material has accumulated in the well to form a charge, the piston then pushes the charge along a smooth path, gradually decreasing in size and including a curved 90° bend, which forces the oil impregnated wicking material already accumulated in the path into a bearing element that is clamped in place by the machine.

The bearing element is clamped in place by a ram that is movable between upper and lower positions and cooperates with a stationary platform mounted on the base frame. The lower face of the ram and the cooperating portion of the platform are shaped and dimensioned to receive a bearing element and hold it in place so that the oil impregnated wicking material can be injected into it. The ram includes the curved portion of the path and moves a distance such that when the ram is in its upper position (so that the bearing element can be positioned on the platform) the path is interrupted, thereby preventing the flow of wicking material. Whenever the ram is in its lower or clamping position the two path portions communicate with each other and oil impregnated wicking material can be injected into the bearing element.

The machine is designed so that a charge of wicking material can be injected into bearing elements having minor differences in thickness. This is accomplished by providing the portion of the path in the ram with a bell-shaped hub portion that is larger than its cooperating portion in the remainder of the machine so that the two path portions do not have to be accurately aligned in order for the wicking material to flow smoothly along the path.

Thus, a unit is provided that can be mounted on top of a base frame or overhead delivery of oil impregnated wicking material manufactured in metered amounts by the machine. All the parts of the machine are easily accessible for repair or maintenance. If replacement is required, the unit can simply be removed from the base frame and a new one put in its place. The machine has much fewer moving parts than prior art machines and only includes one operation where pressure is exerted directly against the charge of oil impregnated wicking material. The machine is much more compact than prior art machines primarily because of the single-stroke opeation and because the portion of the machine used to clamp the bearing element in place also includes a portion of the path along which the charge flows.

BRIEF DESCRIPTION OF THE DRAWINGS

For a better understanding of the invention, reference may be had to the following description of a preferred embodiment, taken in conjunction with the accompanying drawings, in which.

DETAILED DESCRIPTION OF A PREFERRED EMBODIMENT

Figure 1:
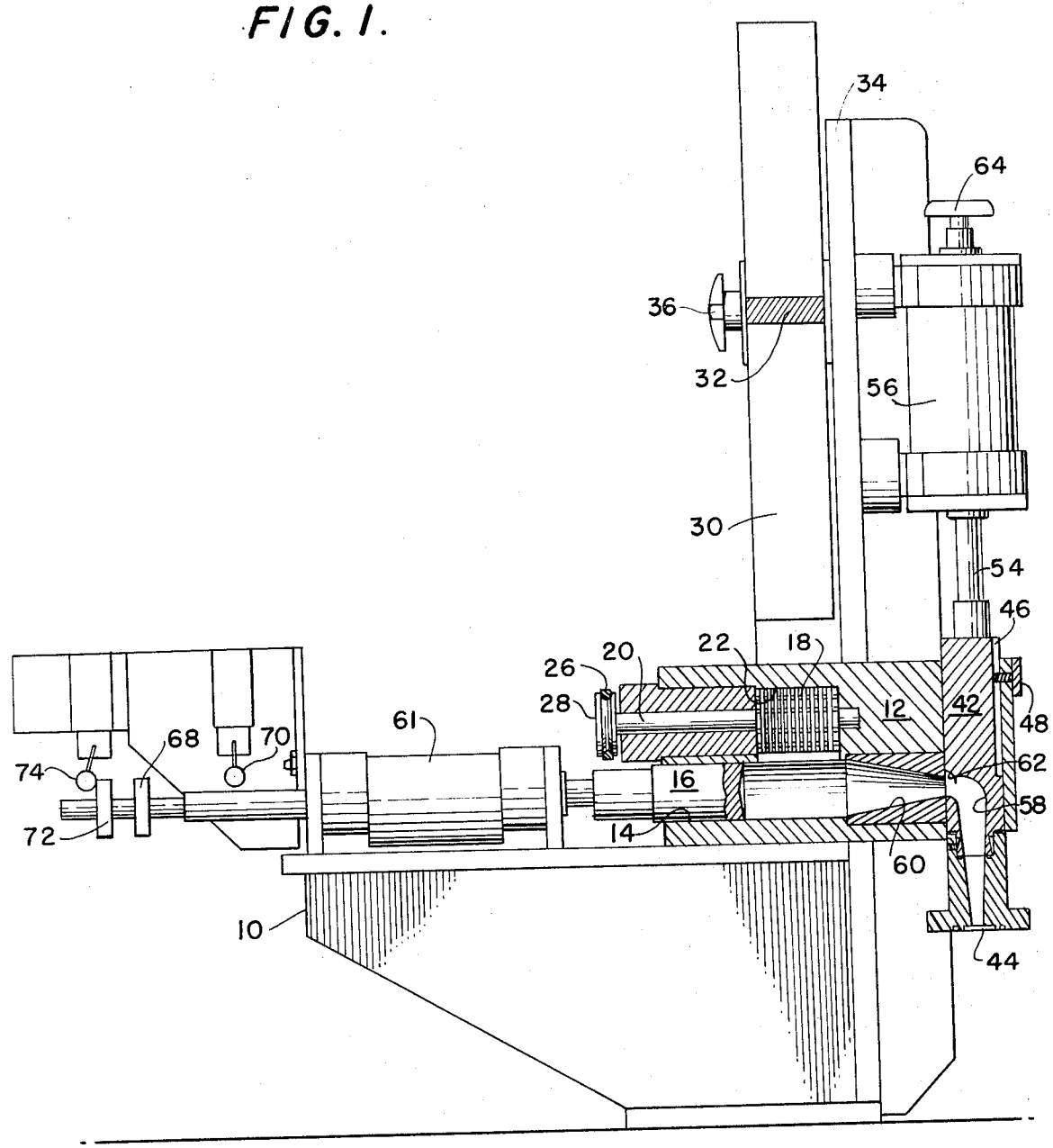
FIG. 1 is a left side elevational view, partially in section, showing primarily the shredder, th piston used to perform the injecting operation, the path along which the charge of oil impregnated wicking material flows, and the ram that holds the bearing element in place, which is shown in its lower clamping position.

Now, a preferred embodiment of the machine capable of manufacturing and injecting metered amounts of oil impregnated wicking material will be described in detail. The machine shown in FIG. 1 is a unit that would normally be mounted on a base frame (not shown) and which can easily be removed and replaced if required.

Figure 4:
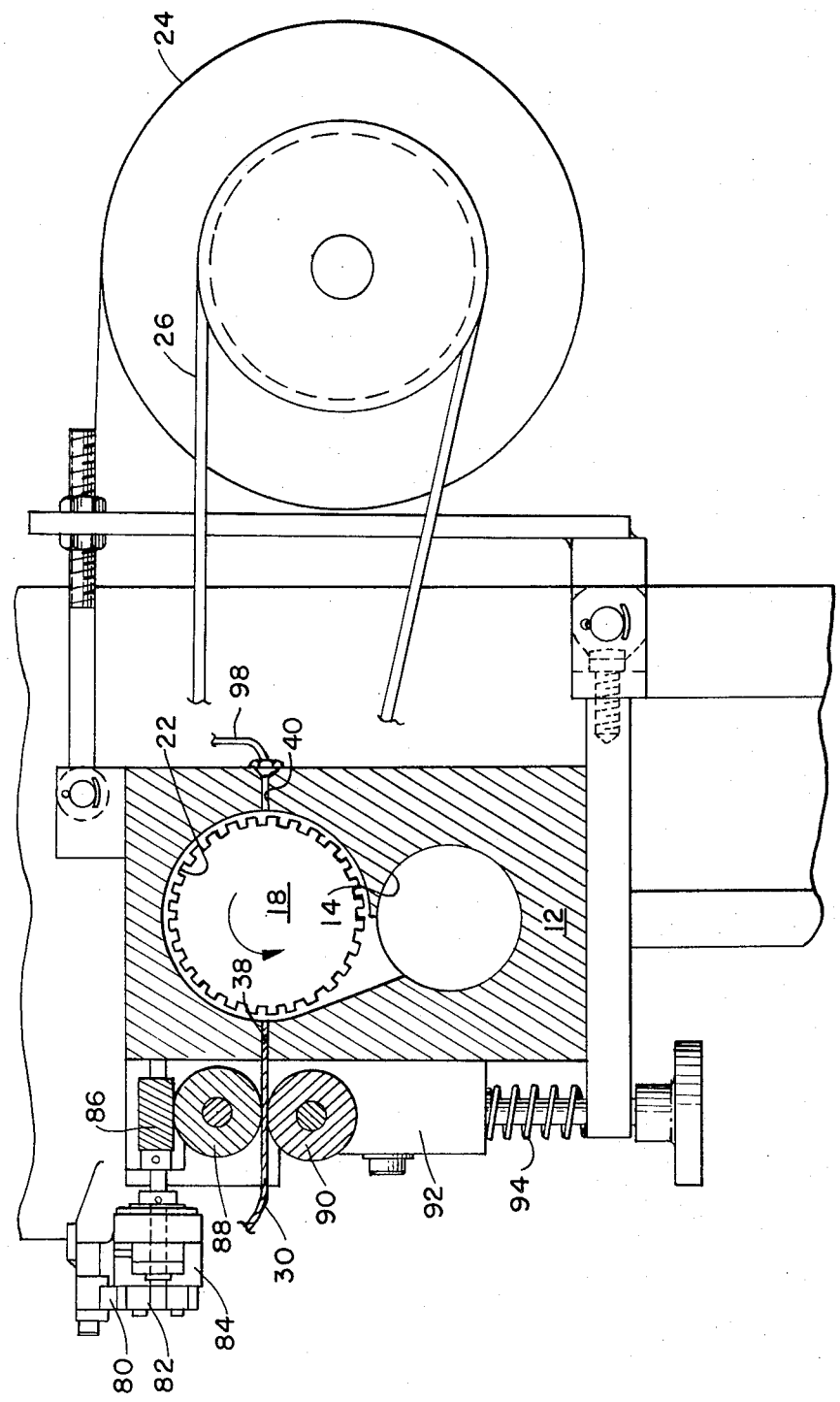
FIG. 4 is a front sectional view looking along the lines 4—4 in FIG. 3.

The unit itself is mounted on a frame 10 and includes the main housing 12. The housing 12 forms the cylinder 14 in which the piston 16 is movable between the back position shown in FIG. 1 and a forward position (not shown). Directly above the portion of the cylinder 14 in which the charge of oil impregnated material accumulates the shredder 18 is rotatably mounted on the shaft 20. The shredder 18 is located in the cavity 22 which is also formed in he housing 12. The shaft 20 is journaled in bearings (not shown) of a suitable size and type and is driven counterclockwise by the motor 24 (see FIG. 4) which is connected through a standard V-belt 26 to the sheave 28.

The web of fibrous wicking material 30, the same width as the shredder 18, is wound around the spool 32 and rotatably mounted directly above the shredder 18 on the vertical frame portion 34. The web 30 is held in place by the knob 36 and is fed into the shredder 18 at a predetermined rate in a manner that will be described in detail below.

The wicking material 30 is fed into the shredder 18 through the radial slot 38 (see FIG. 4) in the housing 12 so that the advancing end of the web 30 will be radially directed against the teeth of the shredder 18 to enable it to loosen and pull the fibers from the web 30.

As the shredder 18 is rotating, a predetermined amount of oil is sprayed into the cavity 22 through an opening 40 in the housing 12 (see FIG. 4) that communicates with the cavity 22 diametrically opposite the slot 38. The oil is injected under pressure and forms a fine mist at its hits the teeth of the shredder 18. The oil impregnates the shredded fibers which then fall by gravity into the cylinder 14 to form a metered charge of oil-laden wicking material to be injected into the well of a bearing element (not shown). The means used to introduce the oil under pressure and its operation in conjunction with the overall operation of the machine will be described in detail below.

The machine also includes the ram 42 which is shown in FIG. 1 in its lower or clamping position. The ram 42 cooperates with a platform (not shown) mounted on the base frame for clamping the bearing element in place so that the charge of oil impregnated wicking material can be injected. The lowermost surface 44 of the ram 42 is shaped and dimensioned to receive and hole in place the bearing element into which the charge is to be injected. As shown in FIG. 1, the bottom portion of the arm 42 is replaceable so that the machine can be used in conjunction with different types of bearing elements or so that the bottom portion can be replaced if it becomes worn or damaged.

Figure 2:
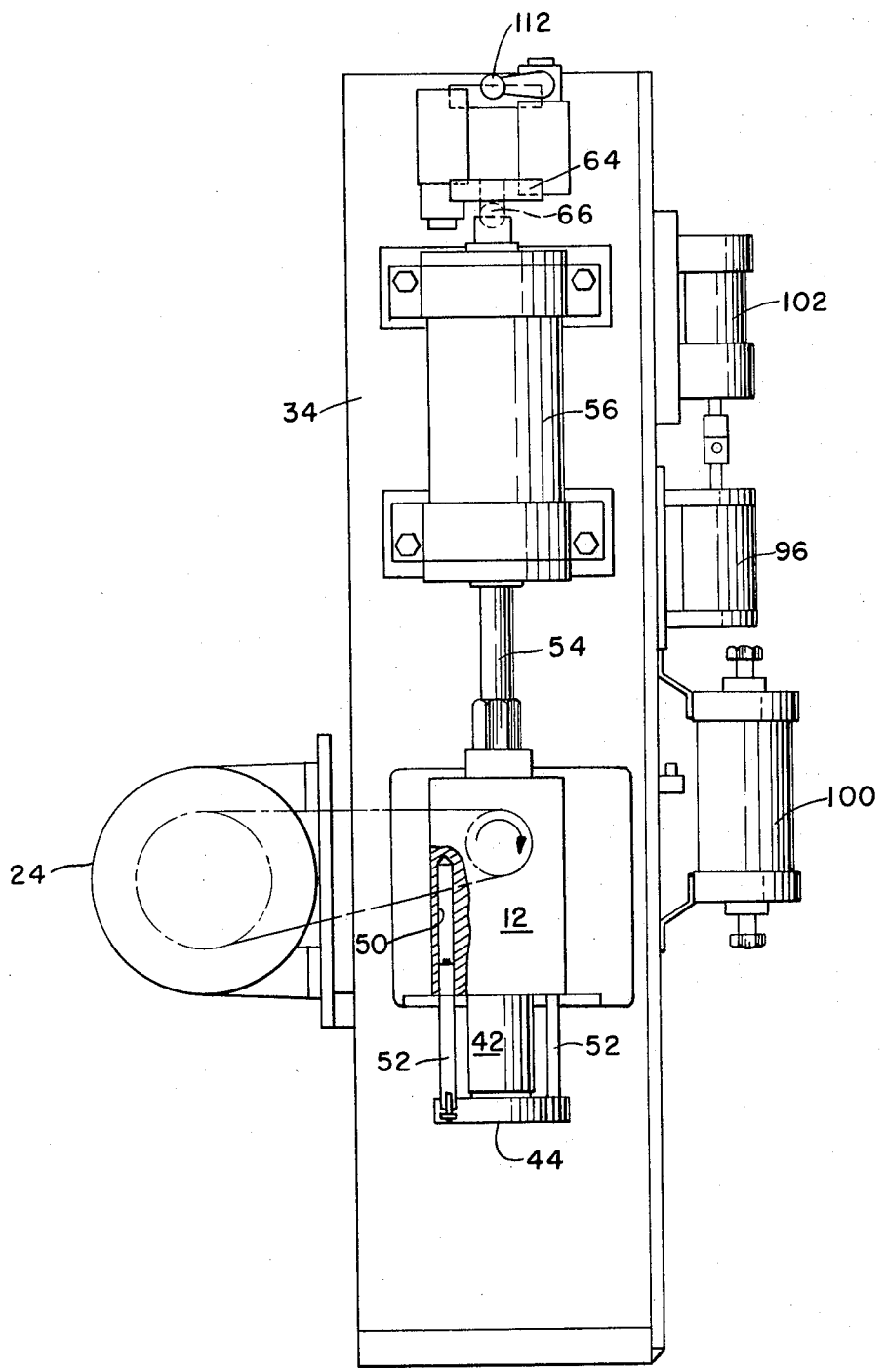
FIG. 2 is a front elevational view of the machine showing primarily the ram and the valving system used to inject the oil into the fibers produced by the shredder.

The ram 42 is mounted for movement on the housing 12. A slot 46 is provided in the ram 42, the slot 46 cooperating with the key 48 which projects through the housing 12. Guides 50 (see FIG. 2) are provided in the housing 12 to cooperate with the guide bars 52, that are mounted in the ram 42, to insure precise vertical movement of the ram 42 relative to the housing 12 and the bearing element.

The arm 42 is raised and lowered by means of the rod 54 is connected to a piston (not shown) that is movable in the cylinder 56 mounted above the ram 42 on the vertical frame portion 34.

The ram 42 includes a flow path 58 that communicates with the cylinder 14 and the flow path 60 when the ram 42 is lowered as shown in FIG. 1. When the piston 16 is moved to the right from the position shown in FIG. 1 by a piston (not shown) in the cylinder 61, it will force the accumulated charge of oil impregnated wicking material out of the chamber 14 and into the flow paths 58, 60, which in turn forces the oil impregnated wicking material already in those latter cavities into the bearing element that is held in place by the ram 42.

The entire flow path along which the wicking material flows must be smooth, it is designed so that there are no sharp corners or depressions where the wicking material can accumulate. Once the wicking material sits for a while the oil separates from the fibers which then harden like cement. This type of deposit continually builds up, once it starts, until it impedes the natural flow of wicking material. Thus, the flow paths 58, 60 are smooth so that the accumulated charge of wicking material can be extruded into the bearing element without allowing any build-up of dried fibers. The flow paths 58, 60 also gradually decrease in cross-section from the chamber 16 to the bearing element.

The end of the piston 16 that contacts the wicking material is slightly concave. In this way, when the piston 16 forces the wicking material to the right (from the position shown in FIG. 1) the wicking material will be urged toward the center of the piston 16, thereby preventing the wicking material from building up around the periphery of the piston 16.

The flow path 58 includes a bell-shaped portion 62 adjacent to the flow path 60, which enables the machine to be used with bearing elements with minor variations in thicknesses without adjustment. For the position of the ram 42 shown in FIG. 1, the machine would be used in conjunction with a bearing element of maximum thickness within the capability of the machine, unless of course the platform (not shown) cooperating with the lowermost surface 44 of the ram 42 is adjusted. However, thinner bearing elements can be used with no such adjustment, which would result in the ram 42 being lowered farther than shown in FIG. 1, until the upper edge of the bell-shaped portion 62 coincides with the upper edge of the flow path 60. Thus, the bell-shaped portion 62 provides the machine with a range within which the machine can operate without external adjustment.

The machine is designed for automatic operation so that once the bearing element is in place on the platform (not shown), the operator can acutate a switch and the machine will perform all the necessary steps until the bearing element can be removed and replaced with another one. The cycle begins with the ram 42 in its upper position (not shown). The operator would then actuate a switch (not shown) to energize a solenoid valve (not shown) and force hydraulic fluid into the cylinder 56. This forces the ram 42 toward its lower position to clamp the bearing element into place and align the flow paths 58, 50 to form a flow path for the oil impregnated wicking material.

As the ram 42 reaches its lower position, as shown in FIG. 1, the dog 64 trips the limit switch 66, which in turn activates a solenoid valve (not shown) and forces hydraulic fluid into the cylinder 61 to move the piston 16 to the right from the position shown in FIG. 1. As the piston 16 moves to the right, it forces a previously prepared charge of oil impregnated wicking material located in the cylinder 14 into the flow paths 58, 60, which operates to force the wicking material that has accumulated in those flow paths into the bearing element.

As the piston 16 reaches the end of its path of travel, the dog 68 trips the limit switch 70, which reverses the flow of hydraulic fluid in the cylinder 61 to force the piston 16 back to its original position shown in FIG. 1. When the piston 16 returns to its original position, the dog 72 trips the limit switch 74 to begin preparation of a new charge of oil impregnated wicking material.

First, when the limit switch 74 is tripped the motor 24 is started, which turns the shredder 18 as described above. At the same time, the limit switch 74 activates a solenoid valve (not shown) which forces hydraulic fluid into the cylinder 78 (see FIG. 3) to move the rack 80 toward the position shown in FIG. 3. As the rack 80 moves toward the position shown in FIG. 3, it engages and turns the pinion gear 82. The pinion gear 82 is connected through the overriding clutch 84 to the worm gear 86 so that when the rack 80 is advanced toward the position shown in FIG. 3, it will turn the worm gear 86. However, the overriding clutch 84 prevents the worm gear 86 from turning when the rack 80 returns back to its initial position.

The worn gear 86 engages the teeth of the driving roller 88 for advancing the lead end of the web of fibrous material 30 into the shredder 18. The fibrous material 30 passes between the driving roller 88 and the following roller 90 which is mounted on the pressure block 92 and forced against the driving roller 88 by means of the coil spring 94. In this way, an appropriate amount of pressure will be exerted on the web of fibrous material 30 so that when the driving roller 88 is turned by the worm gear 86 the web of fibrous material 30 will be advanced against the shredder 18.

At the same time the shredder 18 begins rotating and the fibrous material 30 is advanced against the shredder 18, a solenoid (not shown) is energized to shift the four-way valve 96 (see FIG. 2) so that oil under pressure is delivered through the conduit 98 and into the shredder cavity 22. The four-way valve 96 has an intake conduit (not shown) from an external oil supply (not shown) and an outlet conduit 98 (see FIG. 4) that leads to the shredder cavity 22. The conduits (not shown) are connected between the four-way valve 96 and the matering valve 100. Oil passing through one of the conduits moves a piston in the metering valve 100 to deliver a metered amount of oil through the conduit 98 and into the shredder cavity 22. When the four-way valve 96 is reversed, the piston in the metering valve 100 will move the other way and force a metered amount of oil through the other of the connecting conduits into the conduit 98 and in the shredder cavity 22. A piston (not shown) in the cylinder 102 operates the spool of the four-way valve 96 each time its direction is to be changed.

Figure 3:
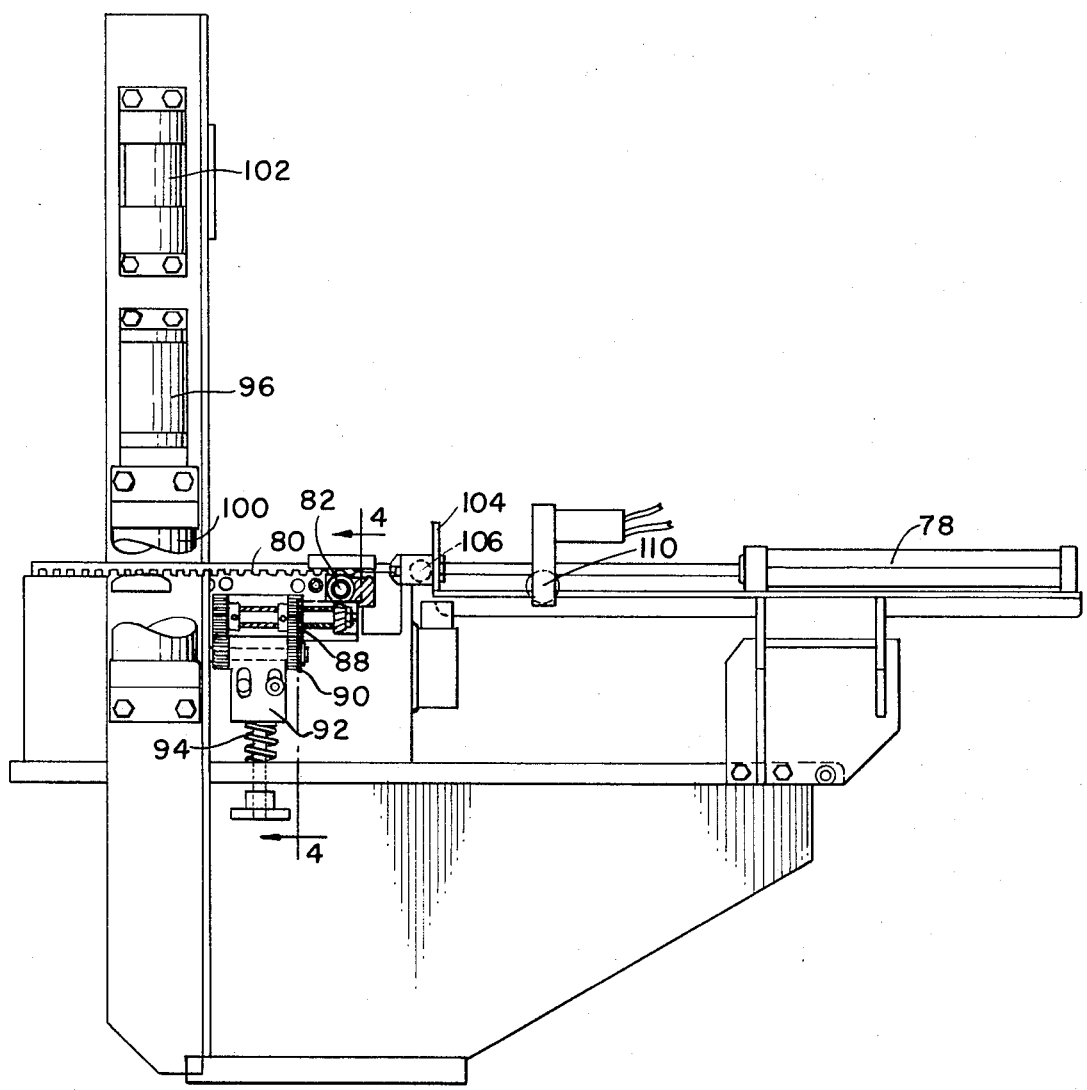
FIG. 3 is a left side elevational view partially in section showing the rollers and the rack and pinion arrangement for advancing the web of fibrous material.

As the rack 80 reaches the end of its travel and is in the position shown in FIG. 3, the dog 104 trips the limit switch 106 to activate the solenoid valve and reverse the flow of hydraulic fluid in the cylinder 78 so that the rack 80 returns to its initial position. At the same time, the limit switch 106 cuts off the motor 24 so that the shredder 18 will stop rotating and ceases the flow of hydraulic fluid into the cylinder 102 so that no more oil will be injected into the shredder cavity 22.

At the same time that the charge of oil impregnated wicking material is being prepared, the arm 42 is moving upwardly away from the position shown in FIG. 1, and back to its initial upper position. The timing of the operation can be set that the rack 80 reaches its initial rest position at about the same time the ram 42 reaches its upper rest position. When the rack 80 reaches that position, the dog 104 trips the limit switch 110 which shuts off the flow of hydraulic fluid into the cylinder 78. When the ram reaches its upper position, the dog 64 trips the limit switch 112 and shuts off the flow of hydraulic fluid to the cylinder 58. Thus, the cycle has been completed and the bearing element into which a charge of oil impregnated wicking material has been injected can be removed. The machine is now ready to repeat the cycle and inject a charge of the oil impregnated wicking material in to another bearing element after it is placed on the platform.

The cycle of the machine described above is only one that can be programmed into the machine and was used merely to illustrate the operation of the different components of the machine. The machine can be programmed to operate differently, depending on the need of the user.

Thus, there is provided in accordance with the invention a machine that can manufacture and inject metered amounts of oil impregnated wicking material into the well of bearing elements held in place by the machine. The machine can be programmed for automatic operation, but utilizes a simple mechanism with a minimum number of moving parts. Pressure is exerted on the wicking material from only one direction and is of such a relatively low magnitude that the oil is not separated from the fibers. All the movable parts of the machine are mounted above the bearing element and are readily accessible so that they can easily be repaired or serviced.

The embodiment of the invention described above is intended to be merely exemplary, and those skilled in the art will be able to make modifications and variations without departing from the spirit and scope of the appended claims. All such modifications and variations are contemplated as falling within the scope of the claims.

I claim:

1. A machine for making lubricant-impregnated wicking material and injecting it into the well of a bearing element, comprising a housing defining a chamber therein, a piston movable in said chamber between first and second positions, means for moving said piston, means for making a charge of lubricant-impregnated wicking material and depositing it in said chamber in the path of said piston when said piston is in the first position, means for clamping the bearing element in place, flow path means between said chamber and said bearing element for providing a smooth path along which lubricant-impregnated wicking material can flow when said piston moves toward the second position.

2. The machine in claim 1, wherein said means for clamping includes a ram movable between first and second positions, said ram including a portion of said flow path means, the portion of said flow path means in said ram communicating with said chamber and said ram clamping said bearing element in place when said ram is in the second position, said portion of the flow path means in said ram being out of communication with said chamber when said ram is in the first position.

3. The machine in claim 2, wherein the axis along which said piston moves is substantially horizontal.

4. The machine in claim 2, wherein the axis along which said ram moves is substantially vertical.

5. The machine in claim 2, wherein said flow path means includes a funnel-shaped portion, gradually decreasing in size, positioned between said chamber and said ram, the small end of the funnel cooperating with the portion of the flow path means in said ram.

6. The machine in claim 5, wherein the portion of said flow path means in said ram includes a smooth 90° bend.

7. The machine in claim 6, wherein the portion of said flow path means in said ram gradually decreases in size.

8. The machine in claim 5, wherein the respective adjacent portions of the chamber and the funnel-shaped flow path portion and the funnel-shaped flow path portion and portion of the flow path means in said ram are substantially the same size and shape so that the lubricant-impregnated wicking material will flow smoothly from the chamber to the bearing element.

9. The machine in claim 8, wherein the path along which the lubricant-impregnated wicking material flows along leaving said chamber continuously and gradually decreases in size.

10. The machine in claim 2, wherein the portion of the flow path means in said ram closest to said chamber includes a bell-shaped enlargement for enlarging said portion so that the ram has a range of movement within which the lubricant-impregnated wicking material can flow uninterrupted from said chamber to said bearing element.

11. the machine in claim 1, wherein the end of said piston facing the portion of said chamber where the charge of lubricant-impregnated wicking material is located is concave.

12. The machine in claim 2, wherein the end of said ram that clamps said bearing element is replaceable.

13. The machine in claim 1, wherein said piston is located above bearing element.

14. The machine in claim 2, wherein said piston and said ram are located above said bearing element, said bearing element being capable of being mounted on a platform to cooperate with said ram for clamping said bearing element.

15. The machine in claim 2, wherein said ram is mounted in a chamber in said housing.

16. The machine in claim 14, wherein said ram includes a key-way, and a key projects through a portion of said housing and cooperates with said key-way.

17. The machine in claim 2, wherein said means for moving said ram includes a piston connected to the end of said ram opposite the end cooperating with said bearing element.

18. The machine in claim 1, wherein said means for preparing a charge of lubricant-impregnated wicking material includes a shredder rotatably mounted in a cavity directly above said chamber, said shredder including a plurality of teeth around its outer periphery for cooperating with the walls of said cavity.

19. The machine in claim 17, wherein a web of fibrous wicking material is rotatably mounted on said machine, the lead end of said web being fed against the teeth of said shredder so that fibers can be pulled from said web by said teeth when said shredder is rotating.

20. The machine in claim 18, and further including means for impregnating said pulled fibers with lubricant.

21. The machine in claim 19, wherein said means for impregnating includes means for supplying oil under pressure into said cavity, said oil impinging against said teeth and forming a mist of fine oil droplets for impregnating said fibers.

22. The machine in claim 18, and further including a pair of rollers urged against each other for feeding the lead end of said web of wicking material into said shredder, and means for driving one of said rollers.

23. The machine in claim 21, wherein said means for driving includes a rack and pinion gear, an overriding clutch is connected to said pinion gear, and a worm gear is connected between said overriding clutch and one of said rollers.

* * * * *

UNITED STATES PATENT OFFICE
CERTIFICATE OF CORRECTION

Patent No. 3,797,089  Dated March 19, 1974

Inventor(s) MARTIN L. ABEL

It is certified that error appears in the above-identified patent and that said Letters Patent are hereby corrected as shown below:

In column 3, line 9, "or" should read -- for --;

line 20, "opeation" should read -- operation --;

line 30, "th" should read -- the --;

line 62, "he" should read -- the --.

In column 4, line 34, "hole" should read -- hold --;

line 37, "arm" should read -- ram --;

line 50, after "54" insert -- which --;

line 64, after "smooth," insert -- and --.

In column 5, line 44, "50" should be -- 60 --.

In column 6, line 11, "worn" should read -- worm --;

line 30, after "22.", "The" should be -- Two --;

line 32, "matering" should read -- metering --;

line 53, "arm" should read -- ram --.

Signed and sealed this 16th day of July 1974.

(SEAL)
Attest:

McCOY M. GIBSON, JR.
Attesting Officer

C. MARSHALL DANN
Attesting Officer